A. J. BANKS.
FERMENTATION METER.
APPLICATION FILED OCT. 13, 1921.
1,429,269.
Patented Sept. 19, 1922.
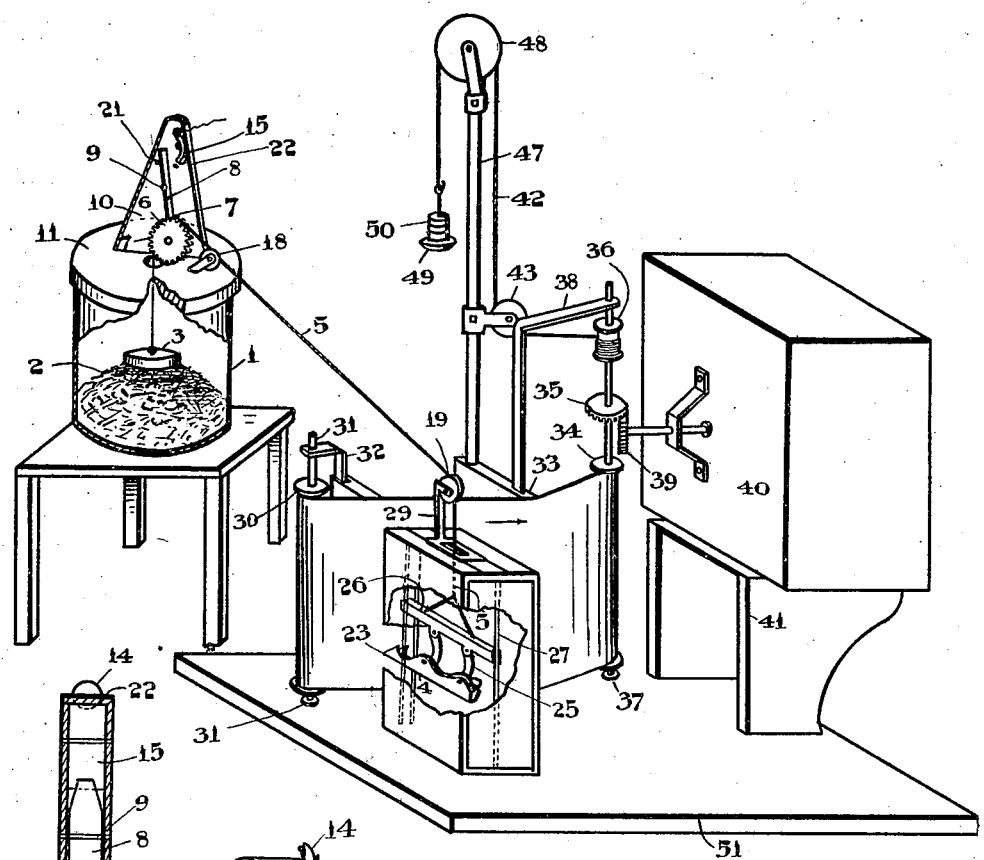
FIG.1
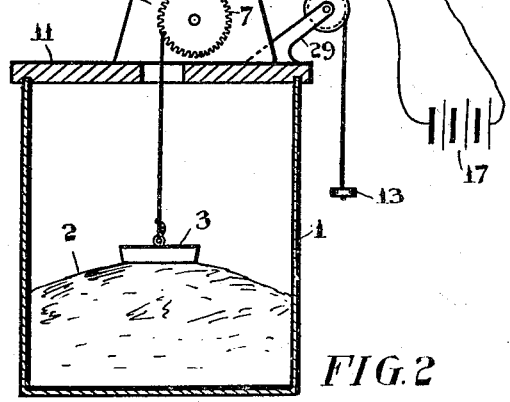
FIG.3
FIG.2
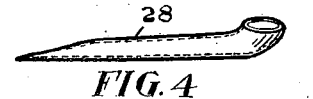
FIG.4
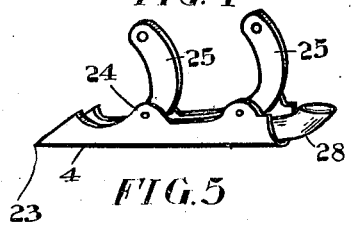
FIG.5
INVENTOR
A. J. Banks
BY Fetherstonhaugh
ATTORNEY Patented Sept. 19, 1922.

1,429,269

UNITED STATES PATENT OFFICE.

ARTHUR JOHN BANKS, OF ST. LAMBERT, QUEBEC, CANADA.

FERMENTATION METER.

Application filed October 13, 1921. Serial No. 507,541.

*To all whom it may concern:*

Be it known that I, ARTHUR JOHN BANKS, residing at 616 Victoria Street, in the town of St. Lambert, in the Province of Quebec, in the Dominion of Canada, have invented a new and useful Fermentation Meter, of which the following is the specfication.

The invention relates to improvement in fermentation meters as described in the present specification and illustrated in the accompanying drawings that form part of the same.

The invention consists essentially of the novel features of construction pointed out broadly and specifically in the claim for novelty following a description in detail of the preferred form of the invention.

The objects of the invention are to devise an apparatus that will enable flour millers, bread manufacturers, brewers or others concerned in the application of fermentation phenomena to ascertain the technical characteristics of such of their processes to the end that they may more thoroughly be safeguarded against such losses or failures as are incident to the lack of acquaintance with, or insight into, the special features of their fermentation problems; and generally to provide a simple and efficient means for testing flour or yeast that will be generally applicable in a general way.

In the drawings Figure 1 is a perspective view of the assembled parts.

Figure 2 is a vertical section of the jar or dough trough showing the machine as applied to manufacturing plants apart from the recording apparatus.

Figure 3 is a vertical sectional view of the signalling mechanism.

Figure 4 is a perspective detail of the ink reservoir.

Figure 5 is a perspective detail of the pen complete.

Like numerals of reference indicate corresponding parts in each figure.

Referring to the drawings the apparatus is here depicted in the determination of the degree of fermentability of flour and in testing operations the receptacle may be a cylindrical glass vessel, or container for the ingredients of the test indicated by the numeral 1 though it may be a dough trough or vat or any other form of receptacle adaptable to fermenting operations.

The numeral 2 depicts a mass of flour dough undergoing expansion as a result of fermentation by yeast or maybe the evolution of gas induced by chemical means.

The float 3 on the dough is more or less finely balanced by means of a suitable weight, which in the case of a recording device is here shown as the pen 4 suspended by the cord 5.

The tension of the connecting cord 5 operates the gear pulley 6 which is formed with the rim teeth 7 engaging the oscillating metal strip connector 8 for moving it either to the right or to the left of a vertical plane through its pivot 9 to indicate an increase or reduction in the volume of the fermenting mass, said gear pulley being journalled in the bracket 10 supported on the cover 11 below the pivot bearing for the pivot 9 of the strip connector 8 in the same bracket.

In the examination of the characteristics of flour, or the gas producing quality of yeast, the maximum expansion of the plastic dough and the time taken are factors of considerable value in the technical control of many commercial operations.

For commercial purposes, that is to say ordinary use, for telling the time that the dough is ready for further handling the weight 13 replaces the pen 4 as the nature of the flour has been previously determined by the meter test and record thereof.

In the instance here recorder the instrument is designed to sound an alarm by means of an electric bell 14 or other form of electrically or mechanically worked signal when the fermenting mass recedes or becomes reduced in volume.

On the downward movement of the float 3 the motion of the gear pulley 6 is reversed, thus throwing the pivoted connector 8 in the opposite direction, in which position it makes contact with the electrical contact 15, which is also pivoted.

The pivot 9 of the connector 8 and the contact 15 are connected to an electric bell 14 or other form of signal and to the battery 17, so that the downward movement of the float 3 rings the bell 14 and notifies the attendant that the dough is ready for handling.

It will be readily understood that under the arrangement explained hereinbefore, the effect of a downward movement of the float 3, will travel by means of the cord 5, the pulley 6, and the guiding pulleys 18 and 19 to the pen 4, causing it to move in an upward direction when this device is used for testing and recording purposes.

21 are stops to control the extent of movement of the metal strip connector 8.

The gear pulley 6 and metal strip connector 8 and electrical connections are contained in a protective case or covering 22 here shown attached to a cover or lid 11, fitted to the vessel 1.

Respecting the charting or recording device, 4 is a marking pen of hard metal or other suitable material in channel form terminating in a point at 23 for inscribing and having side lugs 24 for pivotally connecting the elliptical arms 25 which engage in a similar fashion a light rod 26 of metal or other material suitably connected to and supported by the cord 5, and further controlled in its vertical movement by means of the guiding posts 27. The channel portion of the pen carries a glass ink container 28.

To facilitate the filling of the pen and also to enable it to be brought into or out of action as a recording instrument, the guiding pulley is mounted upon a stand or support 29 capable of forward or backward movement and adjustment.

The cylinder 30 is capable of rotating on its axis 31 and is held in an upright position by suitable supports 32.

The cylinder 30 carries a roll of paper, which latter is stretched across the framework 33 to the second or winding cylinder 34, the axis of which carries a gear 35 and a small additional cylinder or spool 36, the whole being held in a vertical position by a cap or socket 37 at the base, and an arm support 38 attached to the upper part of the framework 33.

39 is a gear attached to the mainshaft of a clockwork timepiece 40 mounted on a stand 41. The gear 39 when engaging with the gear 35, causes the paper to pass slowly from the cylinder 30 to the winding cylinder 34 during which time the pens trace upon it the course of their movement.

To counteract the retarding effect or drag of a series of pens upon the paper, the small cylinder or spool 36 carries a length of cord 42 which passes under the pulley 43, attached to an upright shaft 47, affixed to the framework 33, and over the pulley 48 terminating in a suitable support 49 for counterpoise weights 50.

The whole of the recording device is mounted upon a baseboard 51. The other portion of the apparatus to which the cylinder and its attachments may be lodged at any convenient place or distance that will permit of the connecting cord 5 having freedom of motion.

It must of course be understood that modifications may be made in this device, so long as they are kept within the scope of the claim following. For instance it may not always be desirable to employ a charting or recording device of the nature herein described. It may be desirable to employ the electric current as a means of actuating the markings of the pen or pens. And further, it may not be desirable to employ either the jar 1 or the recording device, but to use the principle of the balanced float and gear with its oscillating contact maker, and the electric signal in direct application to masses of material in course of commercial manufacture.

What I claim is:

In a fermentation meter, a receptacle for the dough, a float adapted to rise and fall with the dough, a switch frame supported by the dough receptacle and including a pulley, a ratchet wheel a switch member in constant engagement with said ratchet and a cooperating fixed switch member, an electric circuit and signal and a weighted cord passing over said pulley and suitable guide.

Signed at Montreal, Canada this 6th day of October, 1921.

ARTHUR JOHN BANKS.